FIG.5.
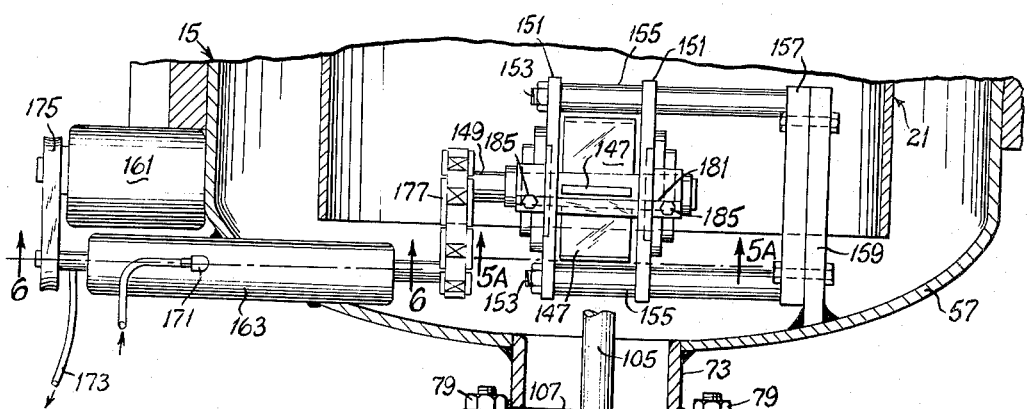
FIG.5A.
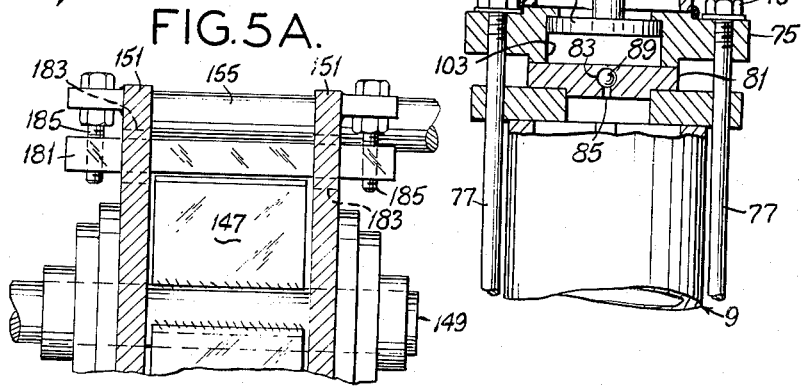
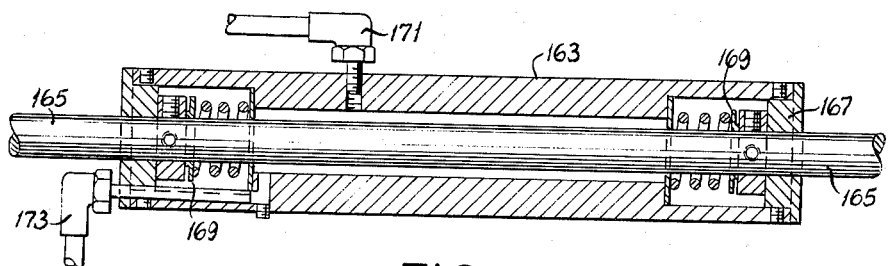
FIG.6.

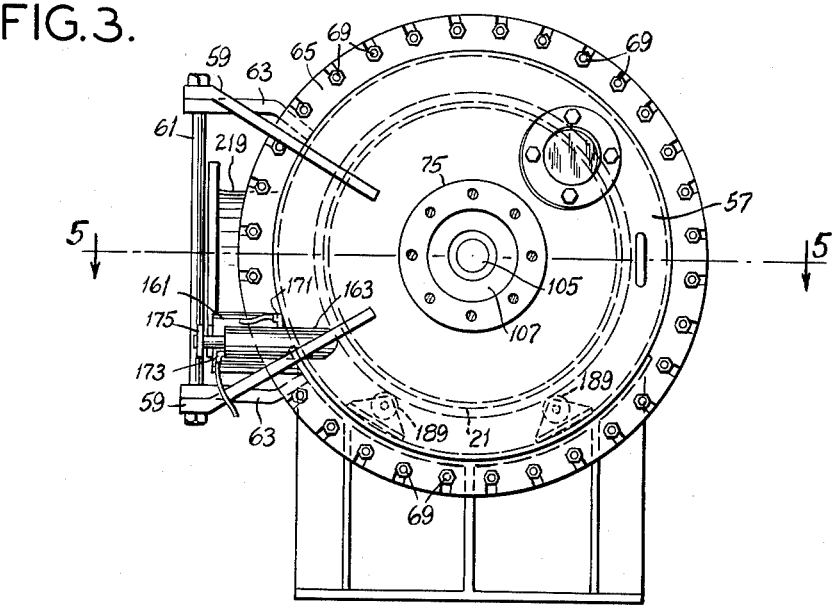
FIG.3.
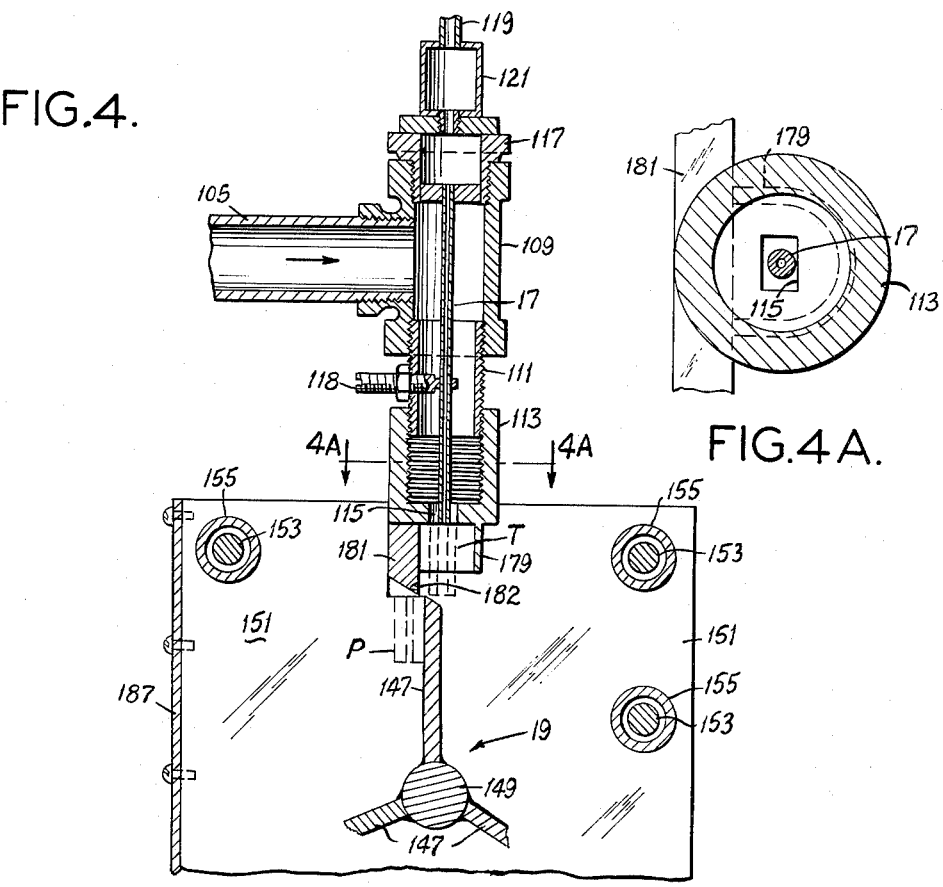
FIG.4.
FIG.4A.

Aug. 24, 1965    D. HALE ETAL    3,202,084
APPARATUS FOR PRODUCING A FOOD PRODUCT
Filed June 19, 1962    6 Sheets-Sheet 6

United States Patent Office 3,202,084
Patented Aug. 24, 1965

3,202,084
APPARATUS FOR PRODUCING A FOOD PRODUCT
Douglas Hale, Creve Coeur, George S. Vasilakes, St. Louis County, and Ronald J. Flier, St. Louis, Mo., assignors to Ralston Purina Company, St. Louis, Mo., a corporation of Missouri
Filed June 19, 1962, Ser. No. 203,640
11 Claims. (Cl. 99—235)

This invention relates to the production of food pellets, and more particularly to apparatus for the production and packaging of food pellets, and especially animal food pellets, which are free or substantially free of pathogens.

Such pellets may be referred to as "sterile" pellets and, in this respect, it will be understood that the term "sterile," as hereinafter used, means substantially sterile as well as completely sterile, and related terms such as "sterilizing" and "sterilization" are to be similarly construed.

In conducting certain experiments with laboratory animals, it is important that all food given to the animals in the course of experimentation be free or substantially free of pathogens (i.e., organisms or viruses which may cause disease) in order to insure that disease in the animals has not been caused by pathogens (at least certain specific pathogens) in the animal food. Pelletized food is a most convenient form for animal food, and one of the objects of this invention is the provision of apparatus for forming food pellets which are sterile, thereby being free or substantially free of pathogens, and packing the pellets in sealed packages under such conditions as to assure the pellets being maintained sterile. In this respect, the invention involves extruding meal with sterilization of the meal during extrusion, pelletizing the extruded sterile meal in a sterile environment, drying the resultant pellets in a sterile environment, and packing the dried sterile pellets and sealing the packages in a sterile or aseptic environment. A feature of the invention is that the meal is extruded into a vacuum tank, where the pelletizing and drying occur, and if any pathogens should possibly escape being killed in the extruder, there is a tendency for their cells to explode in the vacuum tank, thereby doubly insuring sterilization. It is further desirable that the pellets contain fat, also pathogen-free. Accordingly, it is a further object of this invention to provide for incorporation in the sterile pellets of sterile fat, and more particularly to incorporate the fat in the pellets in such manner as to provide for a reasonably uniform distribution of fat throughout the body of each pellet, rather than having the fat concentrated toward the surface of each pellet. This tends to insure that animals will eat all of each pellet, rather than nibbling away only the outside of each pellet, as they would tend to do if the fat were concentrated toward the surface, and thereby avoids waste of food. In this respect, it will be understood that the mode of application of fat of this invention may be useful in the production of unsterile pellets, using unsterile fat, where production of pathogen-free food is not critical. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a side elevation of the apparatus of this invention, certain parts being broken away and shown in section;

FIG. 3 is a section taken on line 3—3 of FIG. 2, on a smaller scale than FIG. 2;

FIG. 4 is an enlarged fragment of FIG. 2 with parts shown in section;

FIG. 4A is an enlarged section taken on line 4A—4A of FIG. 4;

FIG. 5 is an enlarged horizontal section taken on line 5—5 of FIG. 3, with certain parts broken away;

FIG. 5A is an enlarged elevation on line 5A—5A of FIG. 5;

FIG. 6 is an enlarged section taken on line 6—6 of FIG. 5;

Corresponding reference characters indicate corresponding parts throughout the several views of the drawings.

Figure 1:
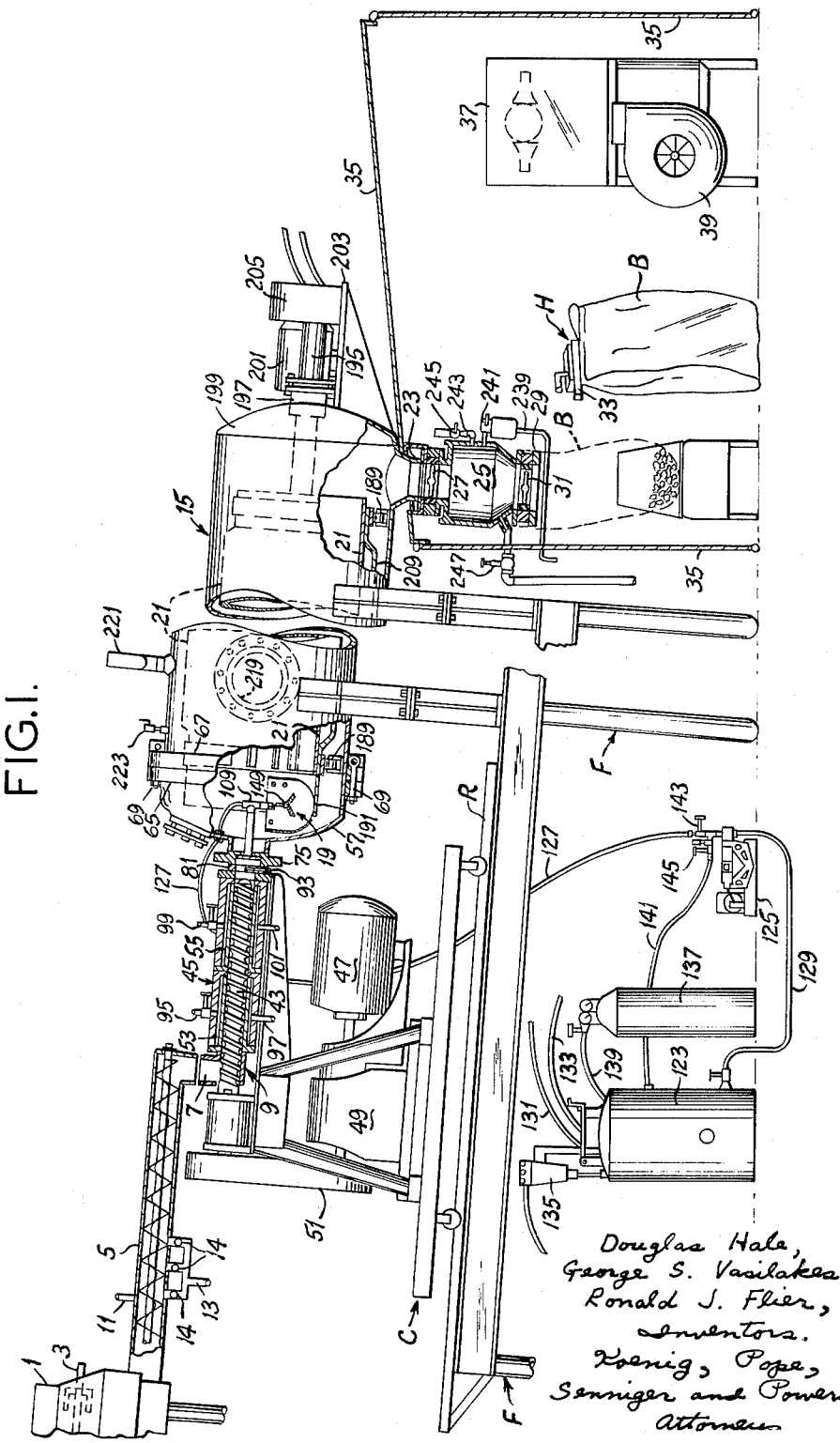

Referring first to FIG. 1, an apparatus of this invention is shown to comprise a hopper 1 for holding a supply of meal to be pelletized. At 3 is indicated an agitator in the hopper for agitating the meal for free flow thereof from the hopper into a conventional screw conveyor 5. The latter feeds the meal at the proper rate (as determined by the speed of the screw) to the inlet 7 of an extruder 9. The meal in the hopper is generally dry, and as the dry meal from the hopper is fed forward by the screw conveyor 5, water is injected at 11 from a suitable source (not shown) to bring the moisture content of the meal up to 25%–30%, for example. Then, downstream from the water injector, steam is injected at 13 from a suitable source (not shown) under control of suitable steam injection valves such as indicated at 14 to bring the temperature of the meal up to 160° F.–210° F., for example. The meal may comprise ground wheat, corn, oats, dried milk, soybean meal and meat meal, for example. The meal in the hopper 1 and in screw conveyor 5 is ordinarily unsterile and may carry pathogens.

The meal is extruded by the extruder 9 into one end of an elongate inclined tank 15, and the meal is sterilized during extrusion, as will be explained. Tank 15 is shown broken away in FIG. 1 to reduce the size of FIG. 1 so that it may fit on the sheet. By way of example, tank 15 may be about three feet in diameter and thirteen feet long. A vacuum is maintained in the tank so that extrusion occurs under sterile conditions. The meal is extruded into one end of the tank in the form of a generally rectangular tubular extrusion indicated at T in FIG. 4 and, as it is extruded, sterile fat is introduced initially into the tubular extrusion by means of what may be referred to as a fat injection needle 17 (see FIG. 4). As the tubular extrusion issues into the tank 15, it is segmented into pellets such as indicated at P by a rotating cutter indicated at 19 in the tank.

Tank 15 slopes downward from its extruder end (its left end as viewed in FIGS. 1 and 2) to its other end, which may be referred to as its discharge end. A steam-heated open-ended hollow drying drum 21 is rotatable in the tank on the inclined axis of the tank. The pellets segmented from the tubular extrusion are thrown into this drum through its open end at the extruder end of the tank, being prevented from being thrown completely to the discharge end of the tank by a baffle arrangement generally designated 22 in the drum (see FIGS. 8 and 9) located adjacent the end of the drum toward the extruder (about two and one-half feet from this end of the drum, for example). The pellets are tumbled in the drum and dried (under the sterile conditions existing in the tank by reason of vacuum being maintained in the tank), travel downward toward the open exit end of the drum at the discharge end of the tank, and ultimately fall out of the drum at the discharge end of the tank.

The vacuum tank 15 has a bottom discharge outlet 23 at its outlet end for discharge of the sterile dried pellets into an outlet chamber 25 which is in sealed relation to the tank. At the top of this chamber there is a valve 27 adapted when closed to seal off the interior of the tank from the chamber and adapted when open to allow pellets to be discharged through outlet 23 into the chamber. The chamber has a bottom outlet 29 with a valve 31 therein adapted when closed to seal off the chamber from the outside and adapted when open to allow discharge of pellets from the chamber. As shown, outlet 29 is formed to enable the mouth of a plastic bag B, such as a polyethylene bag, to be drawn up around the outlet for discharge of a quantity of pellets from chamber 25 into the bag. The filled bag is removed from outlet 29, and its mouth is closed as by heat sealing in the manner indicated at H in FIG. 1, using a conventional heat sealer 33. Chamber 25 extends down from the discharge end of the tank 15 through the top of a suitable enclosure 35, in which an operator may work under sterile or aseptic conditions. This enclosure may be in the nature of a tent made of suitable plastic material, aseptic conditions being maintained therein by washing it down at suitable intervals with a suitable aseptic solution and by continuously recirculating the air in the enclosure through an air filter 37 by means of a blower 39.

Extruder 9 comprises a screw 43 rotary in a housing 45. Screw 43 is driven by a motor 47 through a variable speed gear box 49 and a belt drive 51. Extruder 9, motor 47 and gear box 49 are mounted on a carriage C which rides on rails R on a frame F. Housing 45 is constructed to have a water jacket 53 adjacent its inlet end (its left end as viewed in FIG. 1) and a steam jacket 55 adjacent its outlet end.

The left end of tank 15 is closed by a head 57. This has arms such as indicated at 59 in FIG. 3 by means of which it is pivotaly mounted as indicated at 61 for swinging movement on a vertical axis on a pair of brackets 63 extending out from the cylindrical body of the tank. This enables the head 57 to be swung open. The head and tank have clamping collars 65 and 67 (see FIG. 2) and clamp bolts 69 are provided for clamping the head on the end of the tank with a gasket 71 interposed between the collars to provide a vacuum-tight seal. Head 57 has a central neck 73 on the outer end of which is welded a clamping flange 75. This has holes receiving a pair of bolts 77 extending from the extruder (see FIG. 5), nuts 79 being threaded on the bolts for clamping the extruder 9 in fixed operative position relative to the tank 15. This locks carriage C in its FIG. 1 advanced position. By removing the nuts 79, carriage C may be backed off to allow head 57 to be swung open.

Nuts 79 are tightened securely to clamp a by-pass valve body constituted by a disk 81 between flange 75 and the outlet end of the extruder 9. This disk has a tapped hole 83 (see FIG. 2) extending upward from the bottom thereof, a relatively small axial port 85 providing for restricted flow of meal from the housing into hole 83 and a port 87 providing for flow of meal out of hole 83. Port 87 leads out of hole 83 at a point spaced above hole 85. A by-pass valve 89 is threaded in hole 83, having a reduced-diameter stem 91 extending downward out of the hole with a head 93 on the lower end of the stem for application of a tool to turn it. The arrangement is such that with valve 89 in operative position below port 85, extrusion occurs via port 85, hole 83 and port 87. By screwing in valve 89 to a by-pass position wherein it is located between ports 85 and 87, extrusion occurs via port 85 and thence downward through hole 83 (around stem 91).

With valve 89 in the stated operative position, upon rotation of screw 43, the hot moist meal from conveyor 5 is forced out through port 85 under substantial head pressure (600 p.s.i. or higher, for example). Cold water is circulated through water jacket 53 via an inlet 95 and an outlet 97. This cools the meal in the extruder toward its inlet end to prevent slipping of the meal and enables a positive head of pressure to be maintained on the meal. Steam under pressure (30 p.s.i., for example) is circulated through the steam jacket 55 via an inlet 99 and an outlet 101 for heating the meal to sterilization temperature. Some additional heating of the meal is occasioned by friction and pressure induced by the screw. The screw is driven at such speed as to provide time for the meal to become sterilized under the combination of heat and high pressure to which the meal is subjected in the extrudes. For example, the speed of the screw may be such that it takes approximately thirty seconds for the meal to pass through the extruder. At the start of operations, valve 89 is set in the by-pass position so that meal is by-passed down through hole 83, rather than being fed through port 87, until proper heat and pressure are attained in the extruder for effective sterilization. Then, valve 89 is screwed back to operative position for delivery of the sterilized meal through port 87.

Flange 75 has a cavity 103 into which meal flows from port 87. The meal flows from cavity 103 through a pipe 105 extending axially through the neck 73 and into the tank 15 from a pipe collar 107 received in cavity 103. An extrusion head constituted by a T 109 has its stem threaded on the end of the pipe in the tank with the head of the T extending generally vertically (see particularly FIGS. 2 and 4). A nipple 111 extends down from the lower end of the head of the T and has an extrusion nozzle 113 on its lower end. Nozzle 113 has a rectangular extrusion orifice 115 therein (see FIG. 4A). The fat injection needle 17 comprises a tube extending down through the head of the T 113 and through the nipple 111 from a fitting 117 threaded in the upper end of the head of the T, the lower end of the needle being generally centered in orifice 115, so that extrusion T will be tubular. Needle 17 is centered by an adjusting screw 118 threaded laterally in nipple 111. Sterile fat is delivered into the upper end of needle 17 via a delivery line 119 and a coupler 121 at the upper end of fitting 117, flows down through the needle, and exits from the lower end of the needle within the bore of tubular extrusion T. Line 119 extends from a connector 122 secured in tank head 57. At 123 in FIG. 1 is indicated a tank containing sterile fat, and at 125 is indicated a pump for pumping fat from the tank 123 to line 119 via a flexible line 127 connected to connector 122 and adapted to allow tank head 57 to be swung open. A line 129 connects tank 123 to the pump inlet, and line 127 extends from the pump outlet.

For sterilizing the fat in tank 123, there may be provided a steam coil (not shown) in the tank, through which steam is circulated via steam lines 131 and 133. An air-driven stirrer 135 is provided for stirring the fat in the tank to prevent hot spots in the fat. To avoid contamination of the fat by outside air as fat is withdrawn from the tank, a pad of nitrogen may be maintained on top of the tank. For this purpose, a nitrogen cylinder 137 is connected to the tank as indicated at 139. This may maintain a pad of one p.s.i. on the fat, for example. Alternatively, an arrangement for entry of filtered sterile air to the tank as fat is withdrawn may be utilized. To allow for sterilizing the pump before starting a run, a by-pass line 141 is connected between the pump outlet and the tank 123, and cutoff valves 143 and 145 provided for lines 127 and 141. With valve 143 closed and valve 145 open, a closed recirculation circuit is provided, enabling hot fat to be circulated for sterilizing the pump prior to starting a run.

Cutter 19 is shown as a three-bladed cutter, each blade being designated 147. These extend radially from a cutter shaft 149. This shaft is journalled in a frame comprising a pair of bearing plates 151 held in spaced assembly by bolts 153 and spacers 155. The bolts extend horizontally from a mounting plate 157 which is secured to a bracket 159 extending into tank 15 from the tank end head 57. An electric motor 161 for driving the cutter is mounted on the outside of head 57. A cylindric countershaft housing 163 (see FIGS. 5 and 6) is carried by head 57 in sealed relation thereto, extending laterally from inside the head to the outside of the head. A countershaft 165 is journalled in bearings 167 at the ends of this housing. Bearing seals are indicated at 169. Steam at higher pressure than atmospheric pressure is maintained in housing 163 to avoid leakage of outside air (which may carry pathogens) into the tank 15, via a steam inlet 171 and a bleed 173. The countershaft is driven by a belt drive 175 from the motor, and drives the cutter 19 in counterclockwise direction as viewed in FIGS. 1, 2 and 4 via a chain drive 177.

Extrusion nozzle 113 is provided with a downwardly extending skirt 179 of U-shape in cross section and bears on a shear bar 181 which spans bearing plates 151. Bar 181 has a bevelled lower surface with a hardened cutting edge at 182, and is adapted for adjustment up and down in slots 183 in plates 151, adjustment being effected by means of adjusting screws such as indicated at 185 in FIG. 5A. The timing of the cutter 19 is such in relation to the rate of delivery of extrusion T through rectangular orifice 115 that a pellet length of the extrusion feeds downward below the hardened tip of the shear bar during each one-third of a revolution of cutter shaft 149 (there being three blades 147), and each such length is sheared off at the hardened edge of the shear bar by a blade 147 to form a pellet P, which is thrown toward the left by the blade as viewed in FIGS. 1, 2 and 4. Each pellet so thrown toward the left strikes a guide plate or chute 187 spanning the rearward edges of plates 151 which reverses the trajectory of the pellets and directs them into the entrance end of the drum 21. As extrusion T exits downward through orifice 115, fat is injected from the fat injection needle 17 into the bore formed in the extrusion by reason of the lower end of the needle projecting into the orifice, and the fat is thereby taken up internally by the extrusion and soaks into the extrusion from the inside out. Some fat escapes and is thrown onto various surfaces such as the surface of chute 187 and the interior of the entrance end of the drum, and the pellets P, wiping over these surfaces, take up some fat externally, this fat soaking in from the outside. Consequently, a reasonably uniform distribution of fat throughout the body of each pellet is obtained.

Figure 7:
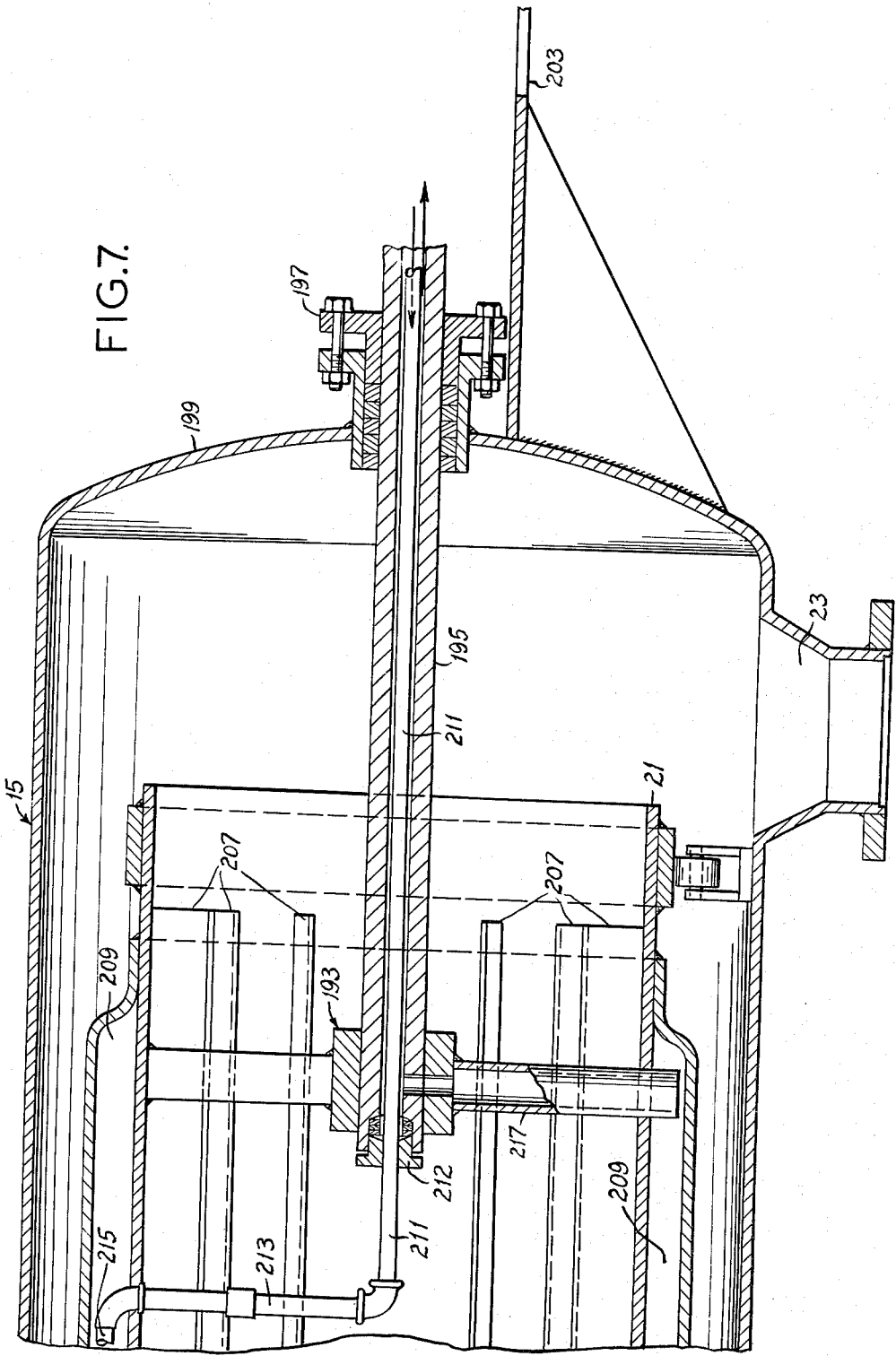
FIG. 7 is an enlarged fragment of FIG. 1 with parts shown in section.

Drum 21 is an elongate cylindrical open-ended drum cradled on rollers 189 in tank 115. It has an extension 191 at its entrance end which surrounds the cutter unit and the extrusion T 109. At its end toward the discharge end of tank 15, the drum has an interior spider indicated at 193 in FIG. 7 from which a tubular shaft 195 extends axially through a gland 197 in the head 199 (which is a fixed head) at the discharge end of the tank. Shaft 195 is driven by an electric motor 201 mounted on a platform 203 extending out from head 199 via a suitable drive enclosed in a housing 205 (see FIG. 1) thereby to rotate the drum on cradling rollers 189. On the interior of the drum there are paddles 207 for tumbling the pellets as they travel from the entrance to the discharge end of the drum (which is inclined from its entrance to its discharge end). The drum is constructed with a steam jacket 209. Steam is introduced into this jacket via a steam pipe 211 extending through the tubular shaft 195 and through a gland 212 at the inner end of the shaft, a lateral pipe 213 extending from the inner end of pipe 211 into the jacket, and a pipe 215 extending longitudinally within the jacket from the outer end of pipe 213 nearly to the entrance end of the drum. Steam exits from the jacket via a pipe 217 associated with spider 193 adjacent the discharge end of the drum interconnecting the jacket and the tubular shaft 195, and the space in shaft 195 around pipe 211. A suitable swivel coupling (not shown) is provided at the outer end of shaft 195 for making the necessary steam connections to shaft 195 and pipe 211 (this pipe rotating with the shaft) while permitting rotation of the shaft. The arrangement is such that pellets delivered to the entrance end of the drum are tumbled around in the drum and dried by heat from the steam jacket 209, ultimately dropping out of the discharge end of the drum, which is spaced back from end head 199 of the tank 15 as appears in FIG. 7, so that the dried pellets may readily drop into the tank discharge outlet 23.

Figure 2:
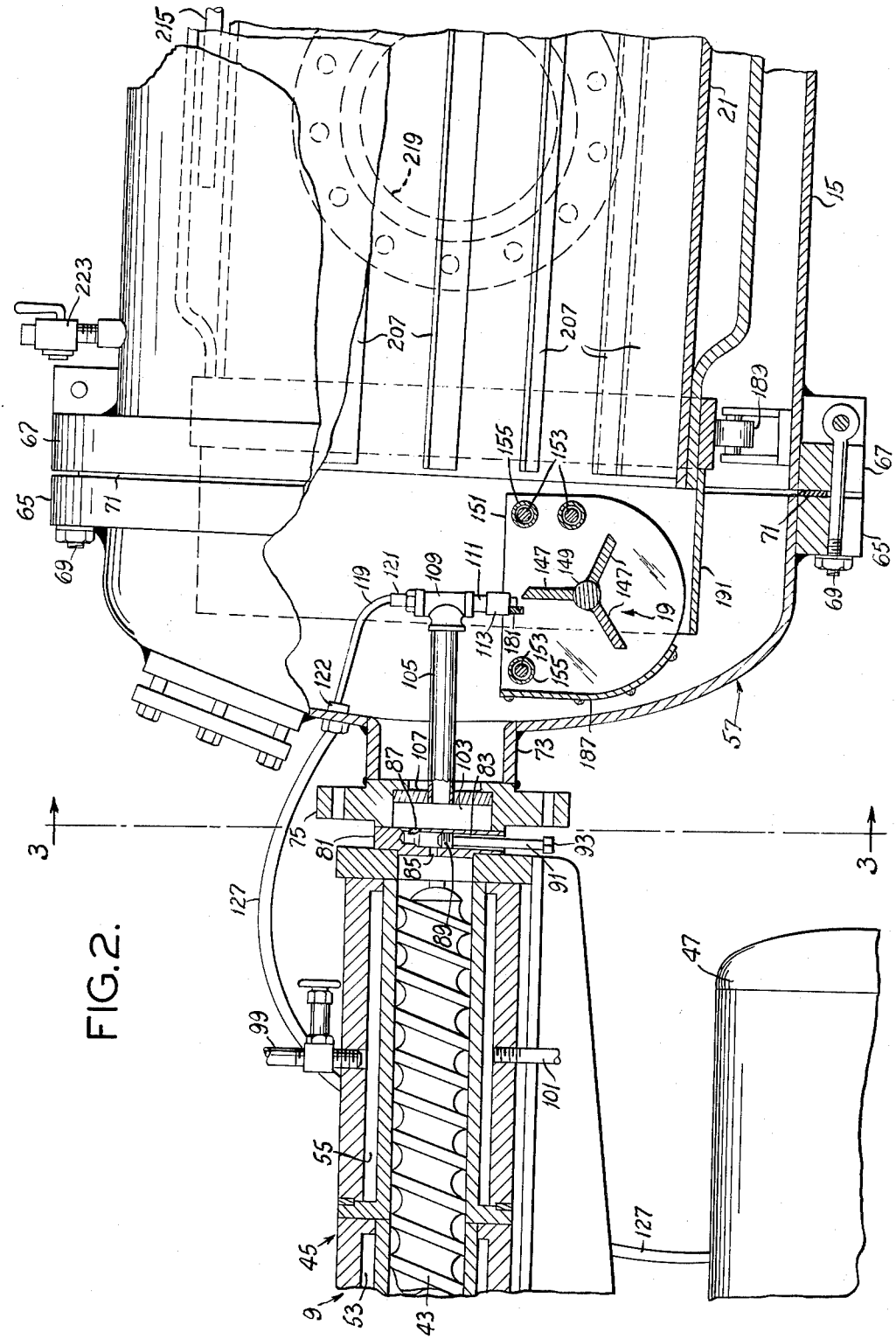
FIG. 2 is an enlarged fragment of FIG. 1.

At 219 in FIGS. 1 and 2 is indicated a port in the cylindric wall of tank 15 providing for connection to an exhaust system (not shown) for exhausting air from the tank to maintain a vacuum in the tank. This may be any suitable type of exhaust system, such as one in which steam at high pressure is forced through venturis at high velocity to cause a pressure drop for exhausting air and thereby drawing a vacuum in the tank. With the exhaust system in operation maintaining a vacuum in the tank 15, extrusion T (FIG. 4) issues into a sterile environment, is pelletized in this environment, and the pellets are dried in this environment. Port 219 is also used for interiorly sterilizing the tank 15 by introducing steam therethrough into the tank. A safety valve for the tank is indicated at 221, and a cutoff valve for bleeding steam from the upper end of the tank is indicated at 223 (see FIG. 1).

Figure 8:
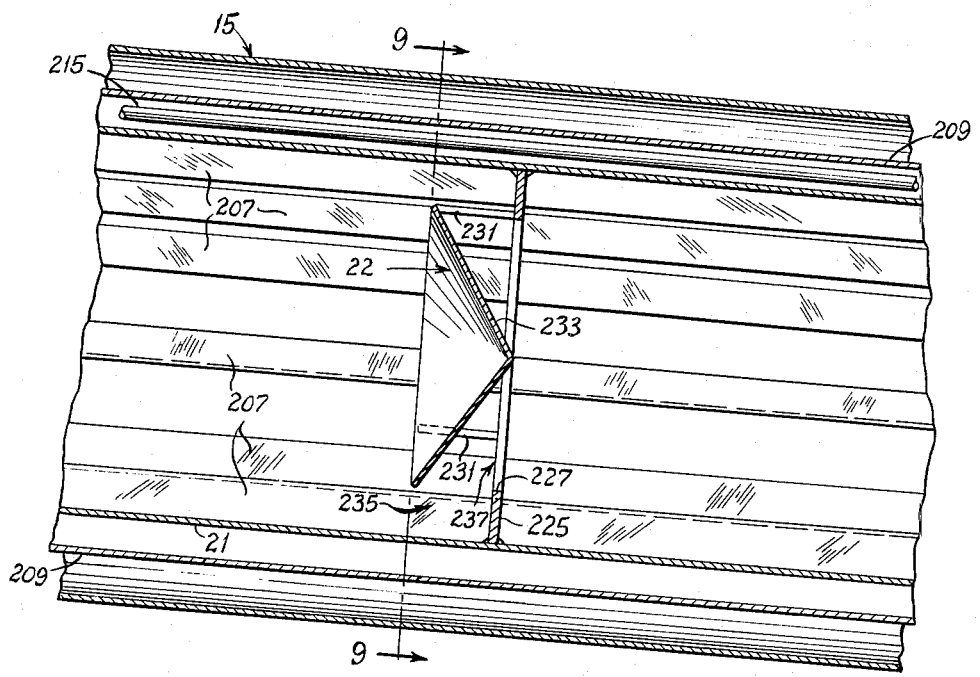
FIG. 8 is a vertical section showing a baffle arrangement.
Figure 9:
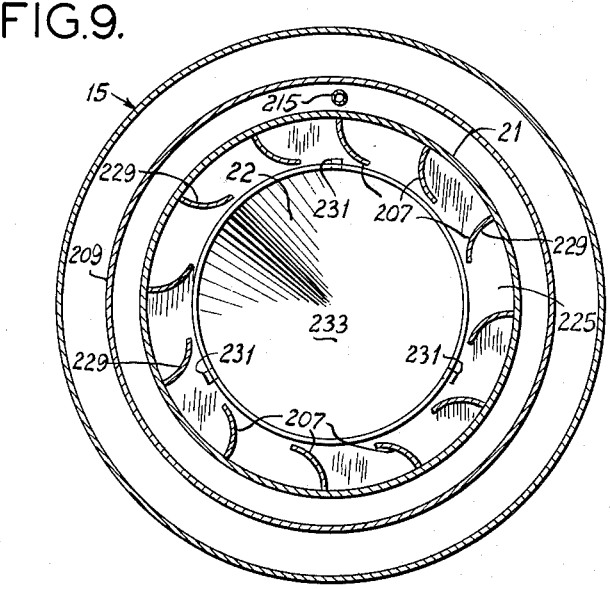
FIG. 9 is a section taken on line 9—9 of FIG. 8.

Baffle arrangement 22 (see FIGS. 8 and 9) comprises a flat circular plate 225 having a large central opening 227 fixed in the drum 21, having slots at 229 for the paddles 207. Arms 231 extending rearward from plate 225 carry a conical baffle 233 arranged as shown in FIG. 8. Pellets which may shoot forward within the drum will strike either the baffle 233 or plate 225, and there is ample space at 235 between the rim of the baffle and the interior of drum and at 237 between the rim of the baffle and plate 225 for pellets to tumble through to the downstream side of the baffle arrangement.

Valves 27 and 31 are gate valves providing an air lock arrangement enabling discharge of pellets without entry of air into the tank 15 to avoid loss of vacuum from the tank. With valve 31 closed, valve 27 may be opened to allow a quantity of dried sterile pellets to drop into chamber 25 from the tank. Then, by closing valve 27 and opening valve 31, the pellets may be discharged from chamber 25 without any substantial entry of air into the tank. Provision is made for blowing a charge of pellets in chamber 25 down into a bag B which has its mouth drawn up around chamber bottom outlet 29 by providing a line 239 for delivering sterile air under pressure (five p.s.i., for example) in chamber 25 under control of a cutoff valve 241. This prevents air from being sucked back into chamber 25 when valve 31 is opened (noting that when valve 27 is opened, a vacuum is drawn in chamber 25). Provision is also made for sterilizing chamber 25 prior to starting a run by connecting a steam line 243 including a cutoff valve 245 to the chamber and providing a steam outlet including a cutoff valve 247.

Assuming that hopper 1 has been loaded with meal to be formed into pellets, that tank 15 and chamber 25 have been sterilized, that the fat in fat tank 123 and the fat delivery system have been sterilized, and that a vacuum is being maintained in tank 15, operation is as follows:

The screw conveyor 5 is driven to feed the meal from the hopper into the extruder 9. Water is injected into the meal in the screw conveyor at 11 to bring the moisture content of the meal up to 25%–30%, for example. Steam is injected into the meal in the screw conveyor at 13 to bring the temperature of the meal up to 160° F.–210° F., for example. Screw 43 of extruder 9 is driven to force the meal through port 85 (see FIG. 2). The by-pass valve 89 is initially screwed up to its by-pass position for initially by-passing meal delivered through port 85 down and out through hole 83, until proper heat and pressure are developed in extruder 9 for sterilization of the meal therein. This is to avoid possible delivery of unsterile meal to extrusion T 109 at the start. Then, valve 89 is backed down to its FIG. 2 operative position, permitting the meal forced through port 85 to pass through hole 83, port 87, cavity 103 and pipe 105 to the T 109, and down through nipple 111 and extrusion nozzle 113. The meal is extruded through rectangular orifice 115 around the lower end of fat injection needle 17 to form the tubular rectangular extrusion T, and fat is delivered internally to extrusion T simultaneously with its exit through the orifice. Since the meal has been sterilized in the extruder, extrusion T is sterile, sterility being maintained by reason of the sterile environment within the vacuum tank 15. If any pathogens escape being killed in the extruder, there is a tendency for their cells to explode as extrusion T exits through orifice 115 into the vacuum in tank 15. Cutter 19, which is continuously driven, segments extrusion T into pellets P, also within the sterile environment of tank 15. The pellets shot off by the blades 147 of the cutter have their direction reversed by the chute 187 and enter the drying drum 21. They tumble along the drum, becoming dry therein by heat from the steam jacket on the drum, all within the sterile environment of the tank 15, and ultimately fall out of the exit end of the drum. With gate valve 27 open, the dried pellets drop into chamber 25.

The operator, in the sterile environment in enclosure 35, and with a charge of pellets in chamber 25, closes valve 27, opens air valve 241 to pressurize chamber 25, pulls the mouth of a bag up around the outlet 29 of chamber 25, then opens valve 31 to blow the pellets from chamber 25 into the bag. Then he quickly closes valve 31, and opens valve 27 for recharging chamber 25 with pellets. The filled bag is then tightly sealed to prevent contamination of the bagged pellets from outside air.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for making sterile food pellets and packaging said pellets in sterile condition comprising an elongate tank mounted in fixed inclined and elevated position sloping downward from one end constituting its rearward end to its other end constituting its forward end, said tank having a port for drawing a vacuum therein to provide a sterile environment in the tank, an extruder outside the tank at the rearward end of the tank comprising a housing and a screw rotary in the housing, said housing having an inlet at one end and an outlet at the other, means for feeding meal to said inlet, means for adding moisture to the meal as it is fed to said inlet, means for cooling the housing adjacent its inlet end to prevent slipping of the meal therein, means for heating the housing adjacent its outlet end to heat the meal therein to sterilization temperature, an extrusion head within the tank adjacent the rearward end of the tank in communication with the outlet end of the extruder housing, means for driving the extruder screw for extrusion of meal through the extrusion head within the tank, means within the tank adjacent the rearward end of the tank for segmenting the extruded meal issuing from the extrusion head into pellets, an open-ended drying drum extending lengthwise of the tank and mounted for rotation on an axis extending lengthwise of the tank, means for rotating the drum, and means for heating the drum, the segmented pellets entering the drum at its rearward end, tumbling along the drum, and exiting from the drum through the forward end of the drum, the forward end of the drum being spaced from the forward end of the tank, said tank having a bottom outlet adjacent its forward end located forward of the forward end of the drum, a packer's enclosure below the forward end of the tank, the interior of said enclosure being adapted to be maintained in aseptic condition, and discharge means extending downward from said tank outlet into said enclosure having means for discharge of pellets in batches from the tank without substantial loss of vacuum in the tank.

2. Apparatus as set forth in claim 1 wherein said discharge means comprises a chamber in communication with the tank outlet, a valve for closing off communication between the tank outlet and said chamber, said chamber having an outlet within said enclosure adapted for reception of the mouth of a package.

3. Apparatus as set forth in claim 2 further comprising means for pressurizing said chamber with sterile air.

4. Apparatus as set forth in claim 1 further comprising means for maintaining a supply of sterile fat outside the tank, and means for delivering sterile fat from said supply to said tank for incorporation in said pellets by soaking into the pellets.

5. Apparatus as set forth in claim 4 wherein said sterile fat delivering means comprises a fat injection needle extending through said extrusion head for effecting tubular extrusion of the meal and application of fat internally to the tubular extrusion to soak into the tubular extrusion from the inside out.

6. Apparatus as set forth in claim 1 further comprising means between the extruder housing outlet and the tank for alternately delivering meal issuing from the extruder housing outlet to said extrusion head or by-passing meal issuing from the extruder housing outlet to a point outside the tank.

7. Apparatus as set forth in claim 1 wherein said extrusion head extends downward and the extruded meal passes downward out of the lower end of the head, wherein said segmenting means comprises blade means rotary on a horizontal axis below the lower end of the head adapted to cut off the extruded meal at the lower end of the head, means for driving the blade means in such direction as to throw each pellet segmented thereby in the direction toward the rearward end of the tank, and guide means in the tank for reversing the direction of the pellets and directing them into the rearward end of the drum.

8. Apparatus as set forth in claim 7 further comprising a baffle in the drum for preventing pellets from being thrown to the forward end of the tank.

9. Apparatus as set forth in claim 7 further comprising means for maintaining a supply of sterile fat, a fat injection needle extending downward through the extrusion head, and means for delivering fat from said supply to said needle, whereby the meal is extruded as a tube and fat is applied internally to the tube, fat also being thrown on to said guide means for application of fat to the outside of the pellets.

10. Apparatus as set forth in claim 1 wherein said extruder housing is mounted on a carriage movable toward and away from the rearward end of the tank with the housing in line with the tank, the forward end of the housing being removably secured to the rearward end of the tank.

11. Apparatus as set forth in claim 10 wherein valve means is provided between the forward end of the housing and the rearward end of the tank for alternately delivering meal to the extrusion head or by-passing meal to a point outside the tank.

References Cited by the Examiner

UNITED STATES PATENTS

| | | | |
|---|---|---|---|
| 955,606 | 4/10 | Moreau | 214—17 X |
| 1,265,853 | 5/18 | Wiseman | 107—14.5 |
| 1,821,639 | 9/31 | Hiller. | |
| 2,139,933 | 12/38 | Chenoweth. | |
| 2,261,224 | 11/41 | Christensen | 99—235 |
| 2,734,226 | 2/56 | Willert | 18—30 |

(Other references on following page)

UNITED STATES PATENTS

| | | | |
|---|---|---|---|
| 2,786,760 | 3/57 | Bonnafoux | 99—2 |
| 2,801,173 | 7/57 | Devareaux | 99—2 |
| 2,838,401 | 6/58 | Gates | 99—238 X |
| 2,871,516 | 2/59 | Sherman | 18—30 |
| 2,905,109 | 9/59 | Schrenk | 107—14.1 |
| 2,970,532 | 2/61 | Skelton | 99—235 |
| 3,018,715 | 1/62 | McCleary | 99—238 |

FOREIGN PATENTS

| | | |
|---|---|---|
| 577,362 | 6/59 | Canada. |
| 914,718 | 6/46 | France. |
| 345,189 | 12/21 | Germany. |

ROBERT E. PULFREY, *Primary Examiner.*

B. H. STRIZAK, JEROME SCHNALL, *Examiners.*